(12) United States Patent
Calhoun et al.

(10) Patent No.: US 6,569,527 B1
(45) Date of Patent: May 27, 2003

(54) PARTICULATE CARBONATES AND THEIR PREPARATION AND USE IN THERMOPLASTIC FILM COMPOSITIONS

(75) Inventors: Allison Anne Calhoun; Dickey S. Shurling, both of Sandersville; David A. Skelhorn, Alparetta, all of GA (US); Deeba Marjan Ansari, Truro Cornwall (GB)

(73) Assignee: Imerys Minerals, Limited, Cornwall (GB)

( * ) Notice: Subject to any disclaimer, the term of this patent is extended or adjusted under 35 U.S.C. 154(b) by 0 days.

(21) Appl. No.: 09/509,667

(22) PCT Filed: May 21, 1999

(86) PCT No.: PCT/GB99/01420

§ 371 (c)(1),
(2), (4) Date: Oct. 10, 2000

(87) PCT Pub. No.: WO99/61521

PCT Pub. Date: Dec. 2, 1999

Related U.S. Application Data

(60) Provisional application No. 60/086,493, filed on May 22, 1998, and provisional application No. 60/099,239, filed on Sep. 4, 1998.

(51) Int. Cl.[7] .............................. B32B 15/02; C08K 9/00
(52) U.S. Cl. .................... 428/402; 264/145; 264/171.1; 264/171.23; 264/210.1; 264/210.6; 264/288.8; 523/200; 523/205; 523/220
(58) Field of Search .............................. 264/145, 171.1, 264/171.23, 210.1, 210.6, 288.8; 523/200, 205, 220; 428/402

(56) References Cited

U.S. PATENT DOCUMENTS 3,472,692 A 10/1969 Isshiki
3,903,234 A 9/1975 Ikeda et al.
4,176,148 A 11/1979 Magder et al.
4,350,655 A * 9/1982 Hoge ........................ 264/145

(List continued on next page.)

FOREIGN PATENT DOCUMENTS

| DE | 37 43 662 A1 | 7/1989 |
| JP | 61-097363 A | 5/1986 |
| WO | WO 99/61521 | 12/1999 |

OTHER PUBLICATIONS

Satoshi Nago et al., "Structure of Microporous Polypropylene Sheets Containing $CaCO_3$ Filler," *Journal of Applied Polymer Science*, vol. 45, 1527–1535, 1992.

Primary Examiner—Samuel A. Acquah
(74) Attorney, Agent, or Firm—Finnegan, Henderson, Farabow, Garrett & Dunner, LLP

(57) ABSTRACT

A method of producing a breathable film which comprises the steps of: (a) producing an inorganic filler by treating particles of an inorganic particulate material comprising an alkaline earth metal carbonate compound by reaction with a hydrophobising surface treatment agent comprising one or more aliphatic carboxylic acids having at least 10 chain carbon atoms to produce a hydrophobic coating on the particles under conditions such that the inorganic filler produced has a total surface moisture level comprising moisture adsorbed on the particles and trapped within the hydrophobic coating thereon of not greater than 0.1% by weight based on the dry weight of the inorganic particulate material; (b) producing a filled thermoplastic composition by mixing the inorganic filler produced in step (a) with a heated thermoplastic polymer; and (c) shaping the composition produced in step (b) by heat processing to form a film product.

41 Claims, 1 Drawing Sheet

U.S. PATENT DOCUMENTS

| | | |
|---|---|---|
| 4,698,372 A | 10/1987 | Moss |
| 5,008,296 A | 4/1991 | Antoon, Jr. et al. |
| 5,011,698 A | 4/1991 | Antoon, Jr. et al. |
| 5,238,193 A | 8/1993 | Pearce |
| 5,300,138 A | 4/1994 | Fischer et al. |
| 5,376,445 A | 12/1994 | Fortuin et al. |
| 5,401,706 A | 3/1995 | Fischer |
| 5,496,397 A | 3/1996 | Fischer et al. |
| 5,695,868 A | 12/1997 | McCormack |
| 5,733,628 A | 3/1998 | Pelkie |
| 5,741,564 A | 4/1998 | Gillberg-LaForce |
| 5,744,530 A | 4/1998 | Skelhorn |
| 5,839,608 A | 11/1998 | Gillberg-LaForce |
| 5,855,999 A | 1/1999 | McCormack |
| 5,910,136 A | 6/1999 | Hetzler et al. |
| 6,015,764 A | 1/2000 | McCormack et al. |
| 6,037,281 A | 3/2000 | Mathis et al. |
| 6,071,450 A | 6/2000 | Topolkaraev et al. |
| 6,075,178 A | 6/2000 | La Wilhelm et al. |
| 6,096,014 A | 8/2000 | Haffner et al. |
| 6,096,668 A | 8/2000 | Abuto et al. |
| 6,111,163 A | 8/2000 | McCormack et al. |
| 6,117,438 A | 9/2000 | Topolkaraev et al. |
| 6,140,551 A | 10/2000 | Niemeyer et al. |
| 6,156,421 A | 12/2000 | Stopper et al. |
| 6,179,939 B1 | 1/2001 | Jones, Jr. et al. |
| 6,258,308 B1 | 7/2001 | Brady et al. |
| 6,261,674 B1 | 7/2001 | Branham et al. |
| 6,264,864 B1 | 7/2001 | Mackay |
| 6,277,479 B1 | 8/2001 | Campbell et al. |
| 6,359,050 B1 | 3/2002 | Dohrer et al. |

\* cited by examiner

PARTICULATE CARBONATES AND THEIR PREPARATION AND USE IN THERMOPLASTIC FILM COMPOSITIONS

This application claims priority from provisional application Ser. No. 60/086,493, filed May 22, 1998, and claims priority from provisional application Ser. No. 60/099,239, filed Sep. 4, 1998.

BACKGROUND OF THE INVENTION

1. Field of the Invention

The present invention relates to a particulate alkaline earth metal carbonate, eg calcium carbonate, for use with a polymer composition for producing a polymer based end product, ie a thermoplastic film product, which may have a high mineral film loading. In particular, the present invention relates to a carbonate, for use in preparing a film composition, and breathable films thereof with an unusually low surface moisture level, and the processing and use of this carbonate.

2. Description of Related Art

Alkaline earth metal carbonates, particularly calcium carbonates are used as a filler in end products comprising compositions incorporating thermoplastic polymers, such as film products. Such films, porous or non-porous, are manufactured for a number of consumer products such as garbage bags, backing materials or outer covers on diapers, bandages, training pants, sanitary napkins, surgical drapes, and surgical gowns. The compositions from which these films are made may include two basic components, the first being a thermoplastic polymer, usually a predominantly linear polyolefin polymer such as a linear low density polyethylene and the second being an inorganic particulate filler such as calcium carbonate. A third component, namely a bonding or tackifying agent may often be present. These components are mixed and compounded together to form a compound or concentrate which is formed (usually in a subsequent process) into a film layer using any one of a variety of film-producing processes known to those of ordinary skill in the film making art including casting, or blowing, or may be laid down on a substrate such as paper or board in a process known as extrusion coating.

After the film is fabricated into its desired form, and if the film is to be a porous breathable film, the film can then be stretched, uniaxially or biaxially, by any of the well-known techniques in the art including by hydraulics, by pinch rolls moving at different rates, or by tentering.

Filler loading levels determine to a great extent how far the precursor film must be stretched to attain a given degree of overall porosity. Below a lower end of the loading range, the pores are less numerous and less interconnected, and therefore, the film is less permeable at a given draw ratio than when a higher filler loading is employed. Above a higher end of the loading range, either the materials will not blend uniformly or the sheet made from the composition will not stretch. The preferred loading in some applications, such as that in manufacturing the microporous film of U.S. Pat. Nos. 5,008,296 and 5,011,698, is very high, eg 60% to 75% by weight of the composition, with the filler preferably being a calcium carbonate.

U.S. Pat. No. 4,698,372 discloses a microporous polymeric film having good water vapour transmission rates and hydrostatic resistance to water penetration thereof. The film has a filler loading of 25–35 volume % of inorganic fillers such as calcium carbonate, among others, and uses an "antagonizer" such as stearic acid in order to reduce the effective surface tension of the filler to the approximate level of that of the matrix polymer.

U.S. Pat. No. 3,903,234 discloses gas permeable biaxially oriented film prepared from compositions of polyolefins containing 26% to 50% by weight of inorganic filler particles.

U.S. Pat. No. 4,176,148 discloses microporous oriented films composed of polybutene containing 3% to 80% by weight of inorganic fillers.

U.S. Pat. Nos. 5,376,445, 5,695,868, and 5,733,628 disclose breathable film or film laminates or composites which may or may not consist of fillers.

If the moisture level within the film forming composition becomes significant, it may be difficult to prepare a film compound and/or to form a film from the compound with a smooth surface which is free from voids. A smooth surface which is free from voids is necessary to enable the film to be stretched uniformly, a process which is generally employed in the production of breathable and other films.

The aforesaid U.S. Pat. Nos. 5,008,296 and 5,011,698 teach a method of maintaining the moisture level of a melt blended composition below 700 parts per million (ppm) and preferably below 300 ppm by cooling the extruded strands and/or pellets composed of polymer plus filler, which are used in the film composition using flowing air or employing vacuum-drying. However this additional processing step is time consuming and costly.

Conventionally in the film making art, usage levels of a mineral filler, such as a ground calcium carbonate, in a host material have been less than 20% loading. In certain applications requiring higher loadings greater than 20%, we have found that conventional filler materials, such as ground calcium carbonate, are unlikely to provide a successful product if made in a conventional manner. Stated in another way, conventional filler products, eg of calcium carbonate, have not been designed in the prior art, to have a surface moisture level which facilitates moisture minimisation when used in thermoplastic polymer composition for film applications, especially for breathable films and for making compositions for preparing such films.

SUMMARY OF THE INVENTION

The purpose of the present invention is to provide a mineral filler comprising an alkaline earth metal carbonate, especially calcium carbonate, which has properties allowing a film end product comprising a thermoplastic polymeric material together with the filler to be easily and successfully produced with filler loading of at least 10 percent by weight, preferably at least 20 percent by weight, and, surprisingly, in some cases at least 40 percent by weight and in some cases even up to 75 percent by weight. Fillers, especially calcium carbonates, produced in a conventional manner would in many cases be unsuccessful in producing such film products without the application of special time consuming and costly additional processing steps during or after the formation of the composition (compound, masterbatch or blend) of filler plus thermoplastic polymer to be employed to produce the film.

We have found that the production and use of a carbonate particulate mineral filler having a reduced moisture level and a low susceptibility to pick up surface moisture can surprisingly be achieved and improves the quality of the filler and the intermediate and final product in which it is used thereby enhancing the preparation of these products. Less processing is required or processing is facilitated in manufacturing the composition comprising the thermoplastic material plus filler and the final product, especially when a breathable film of high filler solids content is to be produced therefrom. We have found that a moisture content above but not below a minimum level (which we have determined and is specified later) associated with the carbonate mineral filler used in the composition for manufacturing a polymer film product can result in unwanted macroscopic size voids or holes (ie several mm in length) forming in the film as a result of steam generation whilst the thermoplastic polymer of the film is in the plastic melt phase. We have shown that in order to avoid such undesirable voids or holes the moisture content of the filler should desirably be limited to or preferably below the specified minimum level at all times before use in producing the composition with the polymer. Although reducing the moisture content of particulate materials has been described previously, eg in JP-A-61-97363 for minimising silver marking in filled plastics moulded bodies, minimisation of adhered surface moisture of a filler for use in producing a high filler loaded composition for fabrication into a film, especially a breathable film, has not previously been suggested in the film making art.

According to the present invention in a first aspect there is provided an inorganic particulate material comprising an alkaline earth metal carbonate suitable for use as a mineral filler in the manufacture of thermoplastic film products which inorganic particulate material is coated with a hydrophobising treatment agent comprising one or more aliphatic carboxylic acids having at least 10 chain carbon atoms and is essentially dry, having a maximum total surface moisture content comprising surface moisture adsorbed and trapped (in the coating) of not more than about 0.10% by weight based on the dry weight of the inorganic particulate material and is not susceptible to further substantial moisture pick-up.

The material according to the first aspect of the present invention will be referred to herein as the 'instant filler'.

Desirably, the total surface adhered moisture level of the instant filler is less than 0.1% by weight even after exposure to an atmosphere of 80% or more relative humidity for 40 hours at a temperature of 20° C.

According to the present invention in a second aspect, there is provided the use of a particulate material as a mineral filler in high filler loading applications in the preparation of a film product by mixing the particulate material by heat processing with a thermoplastic material and by shaping the composition so formed into a film product and which particulate material comprises particles of the instant filler.

The instant filler may comprise a carbonate obtained from a mineral source and processed by refining and treatment processes including grinding to obtain a suitable particle size distribution. In order to satisfy the requirement that the instant filler has a low surface moisture content its particles may be essentially free of hygroscopic or hydrophilic chemicals. The grinding process may be carried out either in a dry state in the absence of added hygroscopic or hydrophilic chemicals or in a wet state in an aqueous medium in which any dispersant employed is minimised and/or subsequently removed from the filler in a known manner. Wet ground material is subsequently dried to an extent such that the particulate material has and maintains an adsorbed moisture content not greater than about 0.1% by weight, preferably less, based on the dry weight of the carbonate.

The particles of the instant filler may be treated (coated) with one of the aliphatic carboxylic acid hydrophobising surface treatment agents conventionally employed to coat carbonates. However, we have found that it is desirable to treat the material with the surface treatment agent in a manner in which the amount of surface moisture when the surface treatment agent is added and therefore can become entrapped is minimised and that a significant surface moisture is not introduced to the particulate material during treating, eg as described later.

DESCRIPTION OF THE INVENTION

The present invention is directed to the preparation and use of the instant filler described earlier as a mineral filler in intermediate and end products containing thermoplastic polymers such as film, especially breathable film, and compositions for forming such products requiring filler loading levels greater than 10 percent by weight, and preferably more than 20 percent by weight, and more preferably at least 40 percent by weight and even up to about 75 percent.

In this specification 'film' means a sheet or layer of material having an average thickness of not more than 250 $\mu$m. Typical thickness sizes and properties of films are described later. The film may be a breathable film, ie having microscopic interconnecting pores not greater than about 30 $\mu$m in size (usually much less). Such a film allows for example water vapour in the atmosphere on one side of the film to permeate to the atmosphere on the other side without liquid water being transmitted through the film.

The instant filler may comprise a white inorganic particulate pigment or filler selected from alkaline earth metal carbonates, eg calcium carbonate, magnesium carbonate, calcium magnesium carbonate or barium carbonate. Such a carbonate may be obtained from a natural source, eg marble, chalk, limestone or dolomite, or may be prepared synthetically, eg by reaction of carbon dioxide with an alkaline earth metal hydroxide, eg calcium hydroxide, or may be a combination of the two, ie naturally derived and synthetic material. Desirably, at least 95%, preferably at least 99%, by weight of the inorganic particulate material comprises alkaline earth metal carbonate although minor additions of other mineral additives, eg one or more of kaolin, calcined kaolin, wollastonite, bauxite, talc or mica, could also be present together with the carbonate. At least 95% to 99% by weight may be calcium carbonate which may be obtained in a well known way by processing naturally occurring calcium carbonate obtained from a mineral source or by chemical synthesis, eg from the reaction of carbon dioxide and lime (calcium hydroxide).

The instant filler preferably has one or more of the following particle size properties:

(i) a mean particle size (approximately equal to the value $d_{50}$ defined below) of from 0.5 $\mu$m to 10 $\mu$m, especially from 0.5 $\mu$m to 5 $\mu$m, eg from 0.8 $\mu$m to 3 $\mu$m;

(ii) a particle size distribution steepness factor, ie $d_{50} \div d_{20}$, where $d_{50}$ is the particle size value less than which there are 50% by weight of the particles, and $d_{20}$ is the particle size less than which there are 20% by weight of the particles, of less than 2.2, desirably 1.1 to 2.2;

(iii) a top cut (the particle size value less than which at least 99% by weight of the particles of the material have a size) of less than 10 $\mu$m, desirably less than 8 $\mu$m;

(iv) a dispersibility as measured by Hegman gauge value, of 20 $\mu$m or less, desirably 13 $\mu$m or less;

(v) a specific surface area of from 3 g.m$^{-2}$ to 6 g.m$^{-2}$ as measured by the BET nitrogen absorption method.

All particle size values as specified herein are measured by the well known standard method employed in the art of sedimentation of the particles in a fully dispersed state in an aqueous medium using a SEDIGRAPH 5100 machine as supplied by Micromeritics Corporation, USA.

Dispersibility may be measured in a manner well known to those skilled in the art using the standard procedure specified in ISO 1524 using as test medium a long-oil alkyd resin with a 68% oil content of vegetable fatty acids, SYNOLAC 60W made by Cray Valley Ltd. The following recipe is used for testing:

| | |
|---|---|
| 42.5 parts by weight | alkyd resin with linoleic oil base with 68% oil content, 70% solution in white spirit; |
| 12.0 parts by weight | white spirit; |
| 1.5 parts by weight | Calcium Naphthenate (4 weight % calcium); |
| 120.0 parts by weight | particulate carbonate filler to be tested. |
| 176.0 parts by weight | |

The above ingredients are weighed into a dispersion container with an inside diameter of 7.5 cm and a height of 6.5 cm. The dispersion is effected by means of a rapidly operating stirrer at 5000 rpm using a toothed dissolver disc with a diameter of 4.0 cm. After a stirring time of 15 minutes the particle fineness obtained is determined by grindometer as specified in ISO 1524.

The instant filler has a total surface moisture content which is less than 0.1% by weight even after exposure for 40 hours at 20° C. to a moist atmosphere having a relative humidity of 80%. Desirably, the surface moisture content is less than 0.1% by weight even after exposure for 40 hours at 20° C. to an atmosphere having a relative humidity of 97%. We have found that minimising the surface moisture content in this way, especially the level of trapped moisture when the instant filler has been surface coated, allows the instant filler to be used in compositions having high filler content loadings by compounding with a thermoplastic polymeric material and other optional ingredients even after storing in a moist atmosphere. We have found that although compounding may be carried out with prior art fillers having a higher surface moisture content use of the instant filler allows easier processing to take place which is not critically dependent on the design of the compounding apparatus employed, eg requiring an evacuation system associated with the compounder having a special efficiency to ensure extraction of moisture and other volatiles, especially when operating at high filler loadings. Furthermore, film products, especially breathable film products can be successfully produced therefrom in a known manner with a low reject rate. In contrast, other fillers not having such a low surface moisture content may make processing to produce film products difficult to control and the reject rate is likely to be higher. Breathable film products will usually have to be rejected if they contain macroscopic voids or holes through which liquid water can pass. Such defects are usually caused by use of a conventional filler having a surface moisture content which has not been suitably controlled, especially a trapped surface moisture content which has not been suitably controlled and minimised during surface coating.

Where the instant filler has been obtained from a natural mineral source it may have been processed eg by known purification, comminution and particle size classification procedures to have a suitable form prior to use to form the instant filler. However, following such processing the amount of hygroscopic or hydrophilic additives present is desirably minimised, as described earlier, eg by removing any such additives used by a washing process.

The instant filler is treated with a hydrophobising surface treatment agent and the treatment may be carried out prior to use by addition to thermoplastic polymeric material. Alternatively, the hydrophobising agent, sometimes referred to as antagonising agent, may be added directly to the thermoplastic polymer with which the instant filler is to be compounded, before, during or after addition of the instant filler. For maximising the effect of the hydrophobising agent, we prefer surface treatment of the instant filler prior to addition to the thermoplastic polymer.

Use of surface treatment agents, which, when added to the inorganic particulate material which is dry, facilitate dispersion of the inorganic particulate material in hydrophobic polymeric material are well known. Suitable surface treatment agents are known to include aliphatic carboxylic acids having from 10 to 24 carbon atoms in their chain, eg stearic acid, palmitic acid, montanic acid, capric acid, lauric acid, myristic acid, isostearic acid and cerotic acid and mixtures thereof.

The production route employed for producing the instant filler is carefully selected from the many procedures known to those skilled in the art to produce a carbonate product, having an unusual combination of properties, namely:

(i) containing a total surface moisture content not greater than 0.1% by weight based on the dry weight of the carbonate even after exposure to a moist atmosphere;

(ii) being essentially free of hygroscopic and hydrophilic chemicals, especially when treated with the hydrophobising surface treatment agent.

The route selected may involve comminution of the starting carbonate, eg calcium carbonate, by wet grinding. Any dispersant employed is preferably minimised or removed, as described later.

Alternatively, grinding may be carried out by a known dry grinding process.

The wet processing of the carbonate, where employed, may be done either by autogenous grinding or by ball milling and/or by stirred media grinding. In autogenous grinding, the particles of the carbonate ore itself act as the grinding media. The feed to the autogenous grinders is the various quarry run ore. Stirred media grinding uses hard, eg ceramic or graded sand, media usually having particles larger than the particles to be ground. Usually stirred media grinding starts with a finer feed from a classification step.

Where a wet grinding process is employed to produce the instant filler, the amount of water soluble hydrophilic dispersant remaining following grinding is preferably not greater than 0.05% by dry weight of carbonate. We have found that an anionic water soluble dispersant, such as sodium polyacrylate, generally used in a conventional high solids wet grinding or dry grinding process has an undesirable effect on-the ability to dry carbonates and once dried, to maintain that dry state. Such a dispersant is hygroscopic, ie attracts moisture, and as it is water soluble makes elimination of surface water difficult. However, residual amounts of other, less hydrophilic dispersants may be present in greater amounts.

Desirably, treatment with the surface treatment agent the amount of dispersant or other hydrophilic chemical on the carbonate is not greater than 0.05 percent by weight based on the dry weight of the carbonate.

The wet processed ground carbonate may be washed and dewatered in a known manner, eg, by flocculation, filtration or forced evaporation, prior to drying. A polyelectrolyte might be added in small quantities where it is to be used to flocculate the mineral for ease of dewatering, but the amount of such polyelectrolyte preferably is not greater than 0.05 percent by weight based on the dry weight of carbonate.

Following grinding, the carbonate from which the instant filler is to be produced may be dried by removing water to leave not more than about 0.10 percent (desirably less than 0.10 percent) by weight surface moisture content associated with the material. This drying procedure may be carried out in a single step or in at least two steps, eg by applying a first heating step to the carbonate to enable the adhered moisture content to be reduced to a level which is not greater than about 0.20 percent by weight based on the dry weight of the carbonate; and applying at least a second heating step to the carbonate to reduce the surface moisture content thereof to 0.10% by weight or less. The carbonate is to be surface coated with a hydrophobising surface treatment agent and the second heating step may be applied before and/or during the surface treatment step. The second heating step may suitably be carried out by an indirect heating means as discussed later. The first heating step may be by a direct or indirect heating means.

Where the drying of the surface of the carbonate is carried out by more than one heating step, the first heating step may be carried out by heating in a hot current of air. Preferably, the carbonate is dried by the first heating step to an extent that the adsorbed moisture content thereof is less than about 0.20 percent by weight, preferably less than about 0.10 percent by weight based on the weight of the carbonate.

The ground carbonate may be further dried in the second heating step prior to or during a surface treatment of the carbonate to the extent that the adsorbed moisture content thereof is preferably not greater than about 0.10 percent, preferably not greater than 0.085 percent or less, by weight based on the dry weight of the carbonate.

In any event, the carbonate particles preferably carry substantially no surface moisture, or at most 0.10% by weight, desirably at most 0.085% by weight, at the point the particles are contacted by a surface treatment agent, ie the hydrophobising surface treatment agent comprising an aliphatic carboxylic acid, for surface coating thereof.

The surface treatment of the carbonate preferably is carried out in a dry atmosphere containing a surface treatment agent as a liquid (eg as droplets) in a vessel heated indirectly, eg by a heating jacket, eg containing a heating fluid, eg heating oil.

As described in copending PCT/US98/25332 (herein the "Copending Application" the contents of which are incorporated herein by reference), the temperature of the atmosphere in the vessel is varied and controlled so that a selected atmosphere reaction temperature may be chosen and monitored. The vessel may comprise an elongated heated cylindrical structure. Desirably, the required temperature is maintained throughout the region where the surface treatment agent is applied and exits from that region at about 80° C., desirably about 120° C., or more, eg 150° C. or more. It is theorised by the present inventors that attaining the specified low adsorbed moisture content of or preferably below 0.10 percent can be attained on the particulate carbonate surface using indirect heating in this way since the carbonate being indirectly heated is not exposed to any combustion by-products from a heating furnace, such as water, which would be the instance if a direct heating system were used. A direct heating system generally involves the use of a vessel heated with flue gases which creates an atmosphere of gases including water vapours which can add to the moisture content of the surface of the carbonate in the vessel. Most conventional ground calcium carbonates are heated and surface treated through this direct heating system described hereinbefore. As described earlier, a direct heating system can be employed in the first step to remove most of the surface moisture, eg to a level of not greater than about 0.2% by weight, based on the dry weight of the carbonate, and, thereafter, in the second step use of an indirect heating system is preferably used to avoid the introduction of moisture by the heating step.

The average temperature at which the carbonate is treated with the surface treatment agent may desirably be a temperature in the range 80° C. to 300° C., especially 120° C. to 180° C. with a residence time of the carbonate in the vessel being greater than 2 seconds. The residence time may range from about 50 to about 1000 seconds, eg 50 seconds to 500 seconds.

Preferably, the surface treatment agent comprises stearic acid or a mixture of fatty acids containing stearic acid, eg technical grade stearic acid which typically consists of about 65% by weight stearic acid and about 35% by weight palmitic acid. Other unsaturated fatty acids which may be used to produce carbonates in accordance with the invention may be selected from the group consisting of capric acid, lauric acid, montanic acid, myristic acid, isostearic acid and cerotic acid and mixtures of two or more of these acids and stearic acid and/or graded stearic acids.

The surface treatment agent preferably is a hydrophobising agent which becomes chemisorbed onto the carbonate particles in order to facilitate dispersion of the carbonate in the polymeric thermoplastic material. For example, stearic acid reacts with calcium carbonate to form a chemisorbed coating of calcium stearate thereon. Such a coating gives superior properties to calcium stearate pre-formed as a compound and typically deposited on the carbonate. In that a main objective of the invention is to reduce the moisture content on the surface of the carbonate, thereby to reduce and maintain the moisture content in the system during the manufacturing process of compositions and products therefrom, it can be appreciated that the presence of a hydrophilic agent is highly undesirable and that only very minute traces (ie not greater than 0.05% by weight) of a hydrophilic component are tolerable on the carbonate to be treated with the surface treatment agent.

Desirably, as described in the Copending Application, the amount of surface treatment agent which is present in the heated atmosphere in which the carbonate is to be contacted by and treated with the agent is not substantially greater than the maximum theoretical amount of the agent which can become bonded by chemisorption to the carbonate. This maximum theoretical amount is dependent on the surface area of the particles of the carbonate. The theoretical surface coverage S by the surface treatment agent is given by the equation:

$$S = M_a N A_a \tag{1}$$

where $M_a$ is the number of moles of the surface treatment agent present, $A_a$ is the surface area occupied by 1 molecule of the surface treatment agent, and N is Avagadro's number. Using Equation (1), it can be shown for example that 1 g of technical grade stearic acid (~65% by weight stearic acid and ~35% by weight palmitic acid) covers about 460 m² of the surface of a carbonate. Thus, for a particulate material having a surface area of about 4.7 m2.g$^{-1}$, as measured by the BET nitrogen absorption method, about 0.01 g of surface treatment agent is required to give complete coverage of the surface area of each 1 g of carbonate.

Thus, the required theoretical maximum concentration of the surface treatment agent for a calcium carbonate particulate material having a surface area of 460m²/g is 1.0% based on the weight of the particulate material to be treated. In practice, the amount of surface treatment agent which becomes bonded to (ie chemisorbed onto) the particulate material is less than the theoretical maximum, although by carrying out the surface treatment at a higher temperature than conventionally employed, as described hereinbefore, the amount can approach more closely the theoretical maximum and the amount of undesirable unreacted (physisorbed) surface treatment agent remaining can thereby be advantageously and unexpectedly minimised.

Desirably, as described in the Copending Application, the concentration of surface treatment agent present in the atmosphere in which the particulate material is to be surface treated by the agent is not substantially greater than X% by weight based on the weight of particulate material, where X is given by $$X = T + U \quad (2)$$

where T is the theoretical amount of the agent required to cover the surface area of the particulate material and U is the amount of unreacted surface treatment agent (% by weight based on the dry weight of the particulate material) obtained when the particulate material is in fact treated by the agent under the treatment conditions employed (this may be determined from a previous treatment run under the same conditions). Desirably, the concentration of the applied surface treatment agent is between about 0.8X and about 1.0X.

It has been shown and described in the Copending Application that a suitable amount of surface treatment agent is that required to coat or slightly undercoat or not substantially overcoat the carbonate. The amount required depends on the surface treatment agent employed, as explained earlier. For an agent containing at least 60% by weight stearic acid, for example, the amount is preferably in the range of from about 1.0% to about 1.4% based on the dry weight of the carbonate.

The instant filler is dried to a total surface moisture level not exceeding 0.10 weight percent, and preferably less than 0.085 weight percent, based on the dry weight of the instant filler. Preferably, the surface moisture level is within these specified limits both immediately preceding and following surface coating. The surface moisture level may be measured in a known manner, eg by a Karl Fischer titration apparatus or by a microbalance.

Karl Fischer titrimetry is an accurate and well known moisture measurement method utilising the quantitative reaction of water with iodine. This method is widely used as the standard method of moisture measurement because of its high selectivity and sensitivity.

In coulometric Karl Fischer titration, the sample is added to a pyridine-methanol solution (with iodine and sulfur dioxide as principal components). The iodine, generated electrolytically at the anode, reacts with the water in the sample as shown in Formula (1).

$$I_2 \pm SO_2 + H_2O \rightarrow 2HI + SO_2 \quad (1)$$

Iodine is generated in direct proportion to the quantity of electric charge, according to Faradays' Law.

$$2I^- - 2e \rightarrow I_2 \quad (2)$$

One mole of iodine reacts with and equates quantitatively to one mole of water. Therefore, 1 mg of water is equivalent to 10.71 Coulombs. Based on this principle, water content can be directly determined from the quantity of electric charge required for electrolysis.

Preferably, the instant filler is a ground calcium carbonate produced by either a dry grinding process or a wet grinding process described hereinabove.

The polymeric material to which the instant filler is added to form a high loading (ie greater than 10%) composition may comprise, for example, a continuous thermoplastic polymer matrix.

The instant filler may be incorporated in an application composition (to form an intermediate or end product) together with a thermoplastic polymeric material and other optional conventional additives, eg a bonding or tackifying agent.

The process employed to form the product from the thermoplastic material and the instant filler may be one or more of the methods well known in the art as described later.

The instant filler has been found to work extremely well as a filler in producing intermediate product compositions and final film products therefrom when used together with thermoplastic polymers and other optional ingredients, especially products made from polyolefin based polymers and end products produced therefrom such as cast film, blown film, and extrusion coatings using the instant filler in such applications an especially superior dispersion and extrusion performance, particularly with respect to homogeneity of the film produced and beneficially and surprisingly freedom from voids even at high filler solids. The low associated free moisture content of the instant filler allows the instant filler to be incorporated into formulations (to be made into film products) at filler solids loadings ranging from 10% to as high as 75% and higher (by weight), while maintaining its ability to be processed into useful thin films, especially breathable films having other desirable properties as described later, using known processes, eg using cast or blown film, or extrusion coating processes.

According to the present invention in a third aspect, a method of producing a porous, breathable film includes use in the film forming process of a composition which includes a thermoplastic polymeric material together with a filler, wherein the filler comprises partly or wholly the instant filler defined earlier.

The thermoplastic polymer may form from 10% to 70% by weight and the filler will form from 30% to 80% by weight of the composition, ie combination of the polymer plus filler. The polymer preferably comprises more than 50 percent by weight of olefin units and is referred to as polyolefin resin.

The resins which can be used to provide the polyolefin resin, for example, include mono-olefin polymers of ethylene, propylene, butene or the like, or copolymers thereof as a main component. Typical examples of the polyolefin resin include polyethylene resins such as a low-density polyethylene, linear low-density polyethylene (ethylene-α-olefin copolymer), middle-density polyethylene and high-density polyethylene; polypropylene resins such as polypropylene and ethylene-polypropylene copolymer; poly (4-methylpentene); polybutene; ethylene-vinyl acetate copolymer; and mixtures thereof. These polyolefin resins may be obtained by polymerisation in a known way, eg by the use of a Ziegler catalyst, or obtained by the use of a single site catalyst such as a metallocene catalyst. Above all, polyethylene resins are preferable, and linear low-density polyethylene (ethylene-α-olefin copolymer) and low-density polyethylene are most preferable. Furthermore, in view of the mouldability, the stretchability and the like of the film, the melt index of the polyolefin resin is preferably in the range of about 0.5 to 5 g/10 min.

Desirably, the filler includes at least 50% by weight, eg from 80% to 99% by weight of the instant filler, where one or more other fillers are employed together with the instant filler.

Examples of the other fillers include calcium carbonate (produced not in accordance with the invention), barium sulphate, calcium sulphate, barium carbonate, magnesium hydroxide, aluminium hydroxide, zinc oxide, magnesium oxide, titanium oxide, silica and talc. The average particle diameter of the other filler is preferably 20 μm or less, preferably 10 μm or less, preferably in the range of 0.5 to 51 μm. In order to improve the dispersibility of the other filler in the polyolefin resin, the other filler may be subjected to a surface treatment to render its surfaces hydrophobic, may be used. Examples of the surface treatment agent include the fatty acids such as stearic acid specified earlier.

The composition ratio between the thermoplastic polymeric material, eg polyolefin resin and the filler has an influence on the mouldability and the stretchability of the film as well as the breathability and the moisture vapour transmission of the obtained film. If the amount of the filler is insufficient, adjacent micropores, which are required to be obtained by the interfacial separation of the polyolefin resin and the inorganic filler from each other, are not continuous, so that a porous film having the good gas breathability and moisture vapour transmission cannot be obtained. On the contrary, if the amount of the filler is excessive, defective moulding occurs during the film forming process and the stretchability deteriorates, so that the sufficient stretching cannot be carried out. In view of these limiting factors, the composition ratio between the polyolefin resin and the inorganic filler may be from 25 to 70 parts by weight of the polyolefin resin with respect to from 75 to 30 parts by weight of the filler, eg from 30 to 60 parts by weight of the polyolefin resin with respect to 70 to 40 parts by weight of the filler.

In the manufacture of a breathable film by the method according to the third aspect of the invention a blend or masterbatch of the thermoplastic polyolefin resin and the filler, including the instant filler, may first be produced by mixing and compounding prior to the film production stages.

The mixture of ingredients to be blended by compounding may include in addition to the resin and the filler other known optional ingredients employed in thermoplastic films, eg one or more of bonding agents, plasticisers, lubricants, anti-oxidants, ultraviolet absorbers, dyes, colourants. A bonding or tackifying agent where employed may facilitate bonding of the film after formation to another member, eg a non-woven fibrous layer, or one or more non porous layers.

The polyolefin resin, the filler and if necessary, other optional additives, may be mixed by the use of a suitable compounder/mixer eg a Henschel mixer, a super mixer, a tumbler type mixer or the like, and kneaded and may be pelletized, eg by the use of a single screw extruder or a twin-screw extruder which forms strands which may be cut or broken into pellets.

The masterbatch or blend, eg in the form of pellets, is melted and moulded or shaped into a film by the use of a known moulding and film forming machine.

The film may be a blown film, cast film or extruded film. Other types of films are also considered to be within the scope of the present invention provided the forming technique is compatible with filled films. The film as initially formed may be generally too thick and too noisy as it tends to make a "rattling" sound when shaken and the film may not yet have a sufficient degree of breathability as measured by its water vapour transmission rate. Consequently, the film may be heated, eg to a temperature of about 5° C. less than the melting point of the thermoplastic polymer or more, and then stretched to at least about 1.2 times, preferably at least 2.5 times, its original length to thin the film and make it porous.

An additional feature of the thinning process is the change in opacity of the film. As formed, the film is relatively transparent but after stretching, it becomes opaque. In addition, while the film becomes orientated during the stretching process, it also becomes softer and it does not have the degree of "rattle" that it does prior to stretching. Taking all these factors into consideration, and the desire to have a water vapour transmission rate of at least 100 grams per square meter per 24 hours, the film may for example be thinned to such an extent that it has a weight per unit area of less than about 35 grams per square meter for personal care absorbent article applications and a weight per unit area of less than about 18 grams per square meter for certain other applications.

The moulding and film forming machine may for example comprise, as in the prior art, an extruder equipped with a T-die or the like or an inflation moulding machine equipped with a circular die. The film production may be carried out at some time after the masterbatch production, possibly at a different manfacturing plant. In some cases, the masterbatch can directly be formed into the film without producing an intermediate product, eg by pelletizing.

The film can be stretched in at least a uniaxial direction at a temperature of from room temperature to the softening point of the resin in a known manner such as a roll method or a tenter method to bring about the interfacial separation of the polyolefin resin and the inorganic filler from each other, whereby a porous film can be prepared. The stretching may be carried out by one step or by several steps. Stretch magnification determines film breakage at high stretching as well as breathability and the moisture vapour transmission of the obtained film, and so excessively high stretch magnification and excessively low stretch magnification are desirably avoided. The stretch magnification is preferably in the range of 1.2 to 5 times, more preferably 1.2 to 4 times in at least a uniaxial direction. If biaxial stretching is carried out, it is possible that for example stretching in a first direction is applied in the machine direction or a direction perpendicular thereto, and stretching in a second direction is then applied at right angles to the first direction. Alternatively, the biaxial stretching may be carried out simultaneously in the machine direction and the direction perpendicular thereto. Either method can be applied in making the film in the method according to the third aspect of the present invention.

After the stretching, a heat setting treatment may be carried out if required in order to stabilise the shape of obtained voids. The heat setting treatment may be, for example, a heat setting treatment at a temperature in the range of from the softening point of the resin to a temperature less than the melting point of the resin for a period of 0.1 to 100 seconds.

No particular restriction is put on the thickness of the porous film produced by the method according to the third aspect of the present invention. The thickness should be such as to obtain film unlikely to tear or break and which has appropriate softness and good feel. Usually, the thickness of the porous film is in the range of 5 μm to 100 μm, preferably 10 μm to 70 μm.

For purposes of the present invention, a film is "breathable" if it has a water vapour transmission rate of at least 100 g/m$^2$/24 hours as calculated using the test method described in U.S. Pat. No. 5,695,868. Generally, once the film is formed, it will have a weight per unit area of less than about 100 grams per square meter and after stretching and thinning its weight per unit area will be less than about 35 grams per square meter and more desirably less than about 18 grams per square meter.

The porous film can be suitably utilised in applications requiring softness, for example, as the backing sheet of disposable diapers. No particular restriction is put on the lower limit of the softness, but it is usually about 20 mm.

The porous film prepared by the method according to the second aspect of the present invention having such properties may have a suitable breathability, moisture vapour transmission and feeling as well as excellent mechanical properties and long-term adhesives properties. Therefore, the porous film can be suitably used in products such as disposable diapers, body fluid absorbing pads and bed sheets; medical materials such as surgical gowns and base materials for hot compress; clothing materials such as jumpers, rainwear; building materials such as wallpapers and waterproof materials for roofs and house wraps; packaging materials for packaging desiccants, dehumidifying agents, deoxidizers, insecticides, disposable body warmers; packaging materials for keeping the freshness of various articles and foods; separators for the cells; and the like. The porous film is particularly desirable as a material used in products such as disposable diapers and body fluid absorbing pads. The porous film may in such products be formed into a composite or laminate in one of the ways well known in the art with one or more other layers, eg a non-woven fibrous layer, eg by an adhesive or bonding agent.

DESCRIPTION OF ILLUSTRATIVE EMBODIMENTS

Figure 1:
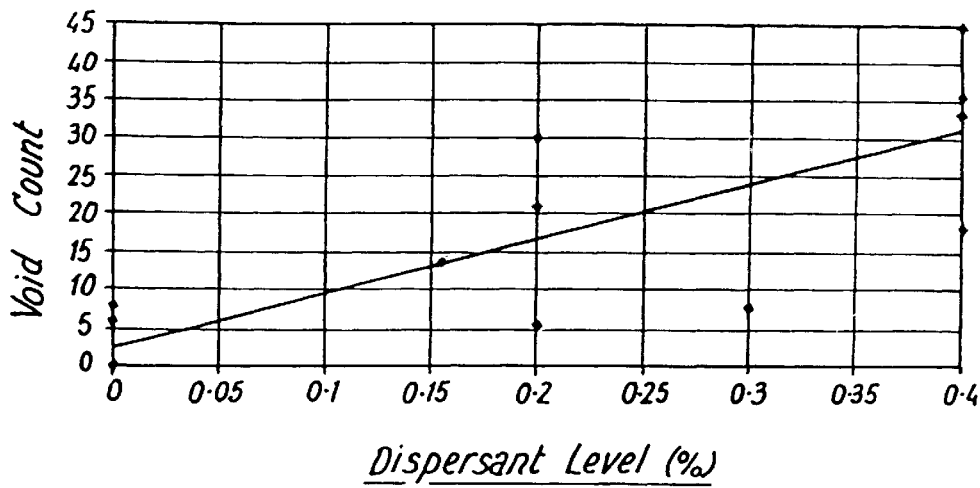
FIG. 1 is a graph of void content versus dispersant level for a 50% by weight calcium carbonate filled film.

Embodiments of the present invention will now be described by way of example only with reference to the following Examples and the accompanying drawings. In the following Example conventionally produced ground calcium carbonates are included for purposes of comparison with the ground calcium carbonate embodying the invention (Sample 5 below).

EXAMPLE 1

Several stearic acid coated calcium carbonate samples prepared under varying conditions as shown in Table 1 below were used to obtain data for correlations to demonstrate the effects of the residual moisture content and residual dispersant content on the surface of calcium carbonates. The contact angle, the adsorbed water content and adsorbed stearic acid content for these several samples were measured.

Measuring contact angle is a simple method of measuring surface energy of a powder. The powder is pressed to form a layer and a droplet of test liquid, eg water, is placed on the layer. The contact angle between the droplet and the layer is then measured.

Adsorbed water is measured by Karl Fischer titration as described earlier. The samples were heated to 195° C.

The amount of chemisorbed and physisorbed stearic acid on each sample was measured. The results are corrected for adsorbed water but not for the adsorbed dispersant. The results are shown in Table 2 and in FIGS. 1 and 2.

TABLE 1

| Sample | Component Of Material |
|---|---|
| 1 | 2 micron, ground wet at 75% solids 0.4% Dispex, Simultaneously Dried and coated at 1.2% stearic acid |
| 2 | Feed as 1 but dried then treated with 1.2% stearic acid with indirect heating. |
| 3 | Feed as 1 but reacted with 0.1% Neodol prior to simultaneously drying and coating at 1.2% stearic acid. |
| 4 | 2 micron, ground at 70% solids, 0.2% Dispex, Simultaneously Dried and coated at 1.2% stearic acid |
| 5 | Product Of Invention 1.3 micron, wet ground zero residual dispersant, flash dried then indirectly heated and coated. |
| 6 | 2 micron, 0.2% dispersant, coated with Industrene B stearic acid in direct heated process |
| 7 | 2 micron, 0.2% dispersant dried & coated with stearic acid on direct fired coater. |
| 8 | 2.0/0.7 micron blend to simulate 1.3 micron product, 0.4% dispersant. Coated 1% with Industrene B stearic acid in direct fired coater. |
| 9 | 2 micron dry ground, direct fired coating process. |
| 10 | 0.7 micron, no dispersant. Treated 1.0% stearic acid in direct heated treatment vessel |
| 11 | 0.7 micron 0.6% dispersant, commercially available material. |

TABLE 2

| Sample | Dispersant Level, wt. % | Void Count | Contact Angle (deg) | Adsorbed Water, wt. % | Stearate Coating Total, wt. % | Chemisorbed wt. % | Physisorbed wt. % |
|---|---|---|---|---|---|---|---|
| 1 | 0.4 | 18.7 | 116.5 | 0.281 | 1.5 | 1.4 | 0.1 |
| 2 | 0.4 | 44.7 | 121.8 | 0.264 | 1.3 | 1.2 | 0.1 |
| 3 | 0.4 | 33.3 | 118.7 | 0.287 | 1.7 | 1.5 | 0.2 |
| 4 | 0.2 | 5.7 | 120.9 | 0.268 | 1 | 1 | 0 |
| 5 | 0 | 0 | 128.1 | 0.084 | 1 | 0.8 | 0.2 |
| 6 | 0.2 | 30.7 | — | — | — | — | — |
| 7 | 0.2 | 21.3 | 117 | 0.108 | 0.9 | 0.8 | 0.1 |
| 8 | 0.4 | 8 | 114.1 | 0.193 | 1.6 | 1.3 | 0.3 |
| 9 | 0 | 5.7 | 123.6 | 0.163 | 0.9 | 0.7 | 0.2 |
| 10 | 0 | 7.7 | 116.9 | 0.213 | 1.2 | 0.9 | 0.3 |
| 11 | 0.4 | 36 | 92.5 | 0.23 | 0.7 | 0.6 | 0.1 |

In Table 1 sizes such as 2 micron etc refer to the approximate median particle size of the calcium carbonate investigated. Additive percentages are by weight based on the dry weight of carbonate Dispex is the trade name of sodium polyacrylate dispersant obtained from Allied Colloids Limited of Bradford, England.

Neodol is the trade name of a non-ionic surfactant manufactured by Shell and used to facilitate sorption of the surface treatment agent by the calcium carbonate. It is a primary alcohol ethoxylate having 6 moles of ethylene oxide units per mole of alcohol.

Industrene B is the trade name of a stearic acid product manufactured by Witco Chemicals.

Figure 2:
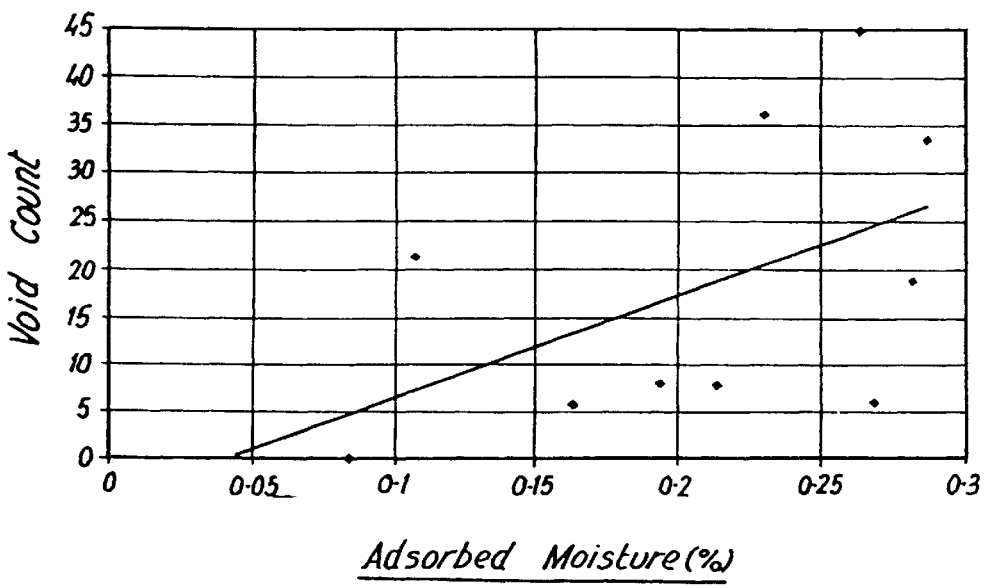
FIG. 2 is a graph of void content versus adsorbed moisture level for a 50% by weight calcium carbonate filled film.

The results in Table 2 show that there is a good correlation between reducing both the dispersant level and surface moisture level and the reduced void count seen in the resultant film (FIGS. 1 and 2). The results in Table 2 also show that the contact angle shows a good correlation with the void count data in Table 2. The contact angle is indicative of the extent of chemisorbed surface coating. The higher the contact angle, the more hydrophobic the surface and consequently, as is known, the fewer defects in the film.

From Table 2, it is apparent that the product embodying the invention (Sample 5) gives the lowest moisture content, ie 0.084 wt % of adsorbed water, and the highest contact angle, ie 128.1°. Both of these results would indicate that this Sample 5 has a "very hydrophobic" stearate coating. In Table 2, the total weight of the stearate coating on the surface of the Sample 5 product is 1.0 weight percent based on the dry weight of the calcium carbonate.

These results confirm that minimisation of residual moisture and hydrophilic chemical on the carbonate provides compositions which when formed into films provide reduced void formation in the film.

EXAMPLE 2

A set of samples was produced to observe the effect of carbonate temperature prior to surface treatment on the properties of a film. These samples consisted of a commercially available processed ground calcium carbonate product referred to as a 1 micron carbonate (ie having a median particle size of about 1 micron). The 1 micron carbonate product employed as starting material is a wet ground product which is treated in a manner such that no residual dispersant remains thereon. It is dried using a flash dryer which is fired directly from a furnace.

These samples were further prepared by preheating the 1 micron calcium carbonate in a convection oven at the temperatures appearing in Table 3 below and adding the heated carbonate to a Wellex Coater set at 110° C. The Wellex Coater is a laboratory blending machine in which circulating oil is employed indirectly to heat the vessel. The heated calcium carbonate particles were added into the vessel and stirred for 1 minute. Solid technical grade stearic acid was added and the two components were mixed vigorously for an additional minute. The concentration of the stearic acid based on the weight of calcium carbonate present was 1.0 per cent by weight. The final moisture level was less than 0.1% by weight.

These carbonate samples were then compounded with a linear low density polyethylene at 50wt % solids to produce a masterbatch of pellets which were subsequently re-heated and blown to produce a film product. There were no macroscopically visual differences in the films produced with the carbonate samples coated as described. The impact strength was obtained using a Dynatup falling weight impact tester which measures the energy required to rupture a sample when a mass is dropped on it.

TABLE 3

| Sample | Temperature (° C.) | Impact Strength (ft. lb.) | Standard Deviation |
|---|---|---|---|
| 1 | 20 | 0.14 | 0.12 |
| 2 | 50 | 0.34 | 0.11 |
| 3 | 75 | 0.30 | 0.13 |
| 3 | 100 | 0.33 | 0.07 |
| 4 | 125 | 0.33 | 0.06 |
| 6 | 150 | 0.41 | 0.05 |
| 7 | 175 | 0.46 | 0.01 |
| 8 | 200 | 0.44 | 0.03 |

As can be seen from Table 3, the standard deviation values for the carbonates preheated in the convection oven to a temperature below 100° C. are considered to be high. At 100° C. and higher, the standard deviation values drop and the impact strength values increase. This indicates that the mineral becomes increasingly compatible with the polymer in which it is dispersed, giving higher and more consistent impact values.

EXAMPLE 3

Samples (several hundred grammes in weight) of various calcium carbonate products were tested for moisture pick-up and therefore suitability for use in the method according to the second aspect of the present invention. Some of the products were dried, coated with a 1.5% by weight coating of Pristerene 4903 (stearic acid-rich coating material) at a temperature of 115° C. for a contact time of 10 minutes in a Steele and Cowlishaw hot mixer. Moisture pick-up of each product coated or uncoated was measured by weighing the product dry and weighing it again following exposure to a moist atmosphere. Such an atmosphere had (a) relative humidity (RH) of 80% at a temperature of about 20° C. for 40 hours and in some cases (b) a relative humidity RH of 97% for 40 hours at a temperature of 20° C. The change in weight in each case was considered to be attributable to moisture pick-up from the moist atmosphere. The results which were obtained are shown in Tables 4 and 5 as follows.

TABLE 4

| (a) Moisture pick-up at 80% RH at 20° C. for 40 hours | | |
|---|---|---|
| Product | Moisture pick-up prior to coating (% by wt) | Moisture pick-up after coating (% by wt) |
| 1 (invention) | 0.194 | 0.064 |
| 2 (invention) | | 0.060 |
| 3 (comparative) | | 0.164 |
| 4 (comparative) | 0.253 | 0.338 |

TABLE 5

| (b) Moisture pick-up at 97% RH at 20° C. for 40 hours | | |
|---|---|---|
| Product | Moisture pick-up prior to coating (% by wt) | Moisture pick-up after coating (% by wt) |
| 1 (invention) | 0.194 | 0.081 |
| 2 (invention) | | 0.090 |
| 3 (comparative) | 0.164 | 0.433 |
| 4 (comparative) | 0.253 | 0.537 |

Further results obtained in a similar manner for exposure of various products to atmosphere having a relative humidity of 50%, 80% and 97% respectively are given in Tables 6 to 9 as follows:

TABLE 6

(c) Moisture pick up after various times at 50% RH at 20° C.

| | Moisture pick up (% by weight) | | |
|---|---|---|---|
| Product | Time 1.5 h | Time 167 h | Time 315 h |
| 5 (invention) | 0.071 | 0.075 | 0.075 |
| 6 (comparative) | 0.154 | 0.150 | 0.142 |
| 7 (comparative) | 0.214 | 0.203 | 0.196 |
| 8 (comparative) | 0.277 | 0.259 | 0.252 |
| 9 (comparative) | 0.260 | 0.231 | 0.226 |

TABLE 7

(d) Moisture pick up after various times at 80% RH at 20° C. (% by weight)

| Product | Time 1 h | Time 23 h | Time 68 h | Time 116 h | Time 337 h |
|---|---|---|---|---|---|
| 10 (invention) | 0.060 | 0.067 | 0.067 | 0.068 | 0.067 |
| 11 (comparative) | 0.140 | 0.180 | 0.167 | 0.174 | 0.163 |
| 12 (comparative) | 0.200 | 0.264 | 0.245 | 0.254 | 0.250 |
| 13 (comparative) | 0.087 | 0.114 | 0.113 | 0.115 | 0.110 |
| 14 (comparative) | 0.133 | 0.152 | 0.140 | | |
| 15 (comparative) | 0.186 | 0.259 | 0.247 | 0.253 | 0.234 |

TABLE 8

(e) Moisture pick up after various times at 97% RH at 20° C. (% by weight)

| Product | Time 2 h | Time 5 h | Time 23 h | Time 223 h |
|---|---|---|---|---|
| 16 (invention) | 0.057 | 0.061 | 0.070 | 0.075 |
| 17 (comparative) | 0.136 | 0.172 | 0.225 | 0.267 |
| 18 (comparative) | 0.217 | 0.240 | 0.323 | 0.369 |
| 19 (comparative) | 0.114 | 0.144 | 0.212 | 0.275 |
| 20 (comparative) | 0.088 | 0.105 | 0.173 | 0.206 |

TABLE 9

(f) Moisture pick up after various times at 97% RH at 20° C. (% by weight)

| Product | Time 3.5 h | Time 22 h | Time 48 h | Time 148 h | Time 218 h |
|---|---|---|---|---|---|
| 21 (invention) | 0.064 | 0.073 | 0.073 | 0.078 | 0.077 |
| 22 (comparative) | 0.174 | 0.263 | 0.273 | 0.300 | 0.279 |
| 23 (comparative) | 0.263 | 0.368 | 0.384 | 0.410 | 0.403 |
| 24 (comparative) | 0.286 | 0.445 | 0.487 | 0.545 | 0.538 |
| 25 (comparative) | 0.256 | 0.426 | | | |
| 26 (comparative) | 0.170 | 0.216 | 0.229 | 0.256 | 0.240 |
| 27 (comparative) | 0.241 | 0.405 | 0.461 | 0.511 | 0.458 |
| 28 (comparative) | 0.166 | 0.220 | 0.238 | 0.272 | 0.251 |
| 29 (comparative) | 0.135 | 0.229 | 0.226 | 0.244 | 0.221 |

The results given in Tables 4 to 9 show that many commercially available calcium carbonate products which are designated as 'comparative' in these Tables have a moisture pick up susceptibility which is unduly high, and such materials especially after storage in a moist atmosphere are, without further treatment, unsuitable for use in forming a composition with a thermoplastic polymeric material to be used in the manufacture of film products.

What is claimed is:

1. A method of producing a breathable film which comprises the steps of:
   (a) providing an inorganic particulate material comprising an alkaline earth metal carbonate compound having a surface moisture content of not greater than 0.1% by weight as determined by Karl Fischer titration;
   (b) treating the inorganic particulate material by reacting said inorganic particulate material with a hydrophobizing surface treatment agent comprising one or more aliphatic carboxylic acids having at least 10 chain carbon atoms to produce a hydrophobic coating on the particles;
   (c) producing a filled thermoplastic composition by mixing the inorganic particulate material of step (b) with a heated thermoplastic polymer; and
   (d) shaping the composition produced in step (c) by heat processing to form a film product.

2. A method according to claim 1 wherein the inorganic particulate material of step (a) has a moisture pick up susceptibility wherein its total surface moisture level is less than 0.1% by weight after exposure to an atmosphere of 80% or more relative humidity for 40 hours at a temperature of 20° C.

3. A method according to claim 1 wherein the inorganic particulate material of step (a) has a moisture pick up susceptibility wherein its total surface moisture level is not greater than about 0.085% by weight based on the dry weight of the inorganic particulate material after exposure to an atmosphere of 80% or more relative humidity for 40 hours at a temperature of 20°C.

4. A method according to claim 1 wherein the hydrophobizing surface treatment agent comprises one or more fatty acids selected from stearic acid, palmitic acid, behenic acid, montanic acid, capric acid, lauric acid, myristic acid, isostearic acid and cerotic acid.

5. A method according to claim 4 wherein the surface treatment agent comprises stearic acid and the amount of said surface treatment agent employed is in the range of from 0.5% to 1.5% by dry weight based on the dry weight of the inorganic particulate material.

6. A method according to claim 5 wherein the amount of the surface treatment agent employed is in the range of from 0.8% to 1.3% by dry weight based on the dry weight of the inorganic particulate material.

7. A method according to claim 1 further comprising, prior to step (a), treating the inorganic particulate material by the steps of (i) grinding the material by a grinding process; and optionally (ii) drying the material.

8. A method according to claim 7 wherein the grinding step (i) comprises wet grinding in an aqueous suspension.

9. A method according to claim 7 wherein the grinding step (i) comprises dry grinding.

10. A method according to claim 1 wherein the treating of the inorganic particulate material with the surface treatment agent is carried out by heating in an indirectly heated vessel having an atmosphere comprising the surface treatment agent.

11. A method according to claim 1 wherein at least 95% by weight of the inorganic particulate material is calcium carbonate.

12. A method according to claim 1 wherein the mean particle size of the inorganic particulate material is in the range from 0.5 $\mu$m to 10 $\mu$m.

13. A method according to claim 1 wherein the specific surface area of the inorganic particulate material is from 3 g.m$^{-2}$ to 6 g.m$^{-2}$ as measured by the BET nitrogen method.

14. A method according to claim 1 wherein the top coat of the particles of the inorganic particulate material is not greater than 10 μm.

15. A method according to claim 1 wherein the thermoplastic polymer comprises a polyolefin.

16. A method according to claim 15 wherein the polyolefin comprises a low density polyethylene or a linear low density polyethylene.

17. A method according to claim 1 wherein in step (c) the composition is extruded and, following extrusion, the film product is stretched in one or two directions.

18. A method according to claim 1 wherein in step (b) the amount of the filler contained in the filled thermoplastic composition is at least 40 percent by weight.

19. A particulate inorganic material for use in the manufacture of breathable thermoplastic films which comprises the inorganic particulate material produced by the method according to claim 1.

20. A method according to claim 1 wherein the moisture content of the inorganic particulate material immediately prior to reaction with the surface treatment agent is achieved by heating.

21. A method according to claim 1 wherein the inorganic particulate material of step (a) has a surface moisture content of not greater than 0.085% by weight as determined by Karl Fischer titration.

22. A method of producing a breathable film which comprises the steps of:

(a) providing an inorganic particulate material comprising an alkaline earth metal carbonate compound and treating the inorganic particulate material by reacting it with a hydrophobizing surface treatment agent comprising one or more aliphatic carboxylic acids having at least 10 chain carbon atoms to produce a hydrophobic coating on the particulate material, wherein the coated particulate material has a surface moisture content not greater than 0.1% by weight as determined by Karl Fischer titration;

(b) producing a filled thermoplastic composition by mixing the coated particulate material of step (a) with a heated thermoplastic polymer; and (c) shaping the composition produced in step (b) by heat processing to form a film product.

23. A method according to claim 22 wherein the inorganic particulate material of step (a) has a moisture pick up susceptibility wherein its total surface moisture level is less than 0.1% by weight after exposure to an atmosphere of 80% or more relative humidity for 40 hours at a temperature of 20° C.

24. A method according to claim 22 wherein the inorganic particulate material of step (a) has a moisture pick up susceptibility wherein its total surface moisture level is not greater than about 0.085% by weight based on the dry weight of the inorganic particulate material after exposure to an atmosphere of 80% or more relative humidity for 40 hours at a temperature of 20°C.

25. A method according to claim 22 wherein the hydrophobizing surface treatment agent comprises one or more fatty acids selected from stearic acid, palmitic acid, behenic acid, montanic acid, capric acid, lauric acid, myristic acid, isostearic acid and cerotic acid.

26. A method according to claim 25 wherein the surface treatment agent comprises stearic acid and the amount of said surface treatment agent is in the range of from 0.5% to 1.5% by dry weight based on the dry weight of the inorganic particulate material.

27. A method according to claim 26 wherein the amount of the surface treatment agent employed is in the range of from 0.8% to 1.3% by dry weight based on the dry weight of the inorganic particulate material.

28. A method according to claim 22 further comprising, prior to step (a), treating the inorganic particulate material by the steps of (i) grinding the material by a grinding process; and optionally (ii) drying the material.

29. A method according to claim 28 wherein the grinding step (i) comprises wet grinding in an aqueous suspension.

30. A method according to claim 28 wherein the grinding step (i) comprises dry grinding.

31. A method according to claim 22 wherein the treating of the inorganic particulate material with the surface treatment agent in step (a) is carried out by heating in an indirectly heated vessel having an atmosphere comprising the surface treatment agent.

32. A method according to claim 22 wherein at least 95% by weight of the inorganic particulate material is calcium carbonate.

33. A method according to claim 22 wherein the mean particle size of the inorganic particulate material is in the range from 0.5 μm to 10 μm.

34. A method according to claim 22 wherein the specific surface area of the inorganic particulate material is from 3 g.m$^{-2}$ to 6 g.m$^{-2}$ as measured by the BET nitrogen method.

35. A method according to claim 22 wherein the top coat of the particles of the inorganic particulate material is not greater than 10 μm.

36. A method according to claim 22 wherein the thermoplastic polymer comprises a polyolefin.

37. A method according to claim 36 wherein the polyolefin comprises a low density polyethylene or a linear low density polyethylene.

38. A method according to claim 22 wherein in step (c) the composition is extruded and, following extrusion, the film product is stretched in one or two directions.

39. A method according to claim 22 wherein in step (b) the amount of the filler contained in the filled thermoplastic composition is at least 40 percent by weight.

40. A particulate inorganic material for use in the manufacture of breathable thermoplastic films which comprises the inorganic particulate material produced by the method according to claim 22.

41. A method according to claim 22 wherein the coated particulate material of step (a) has a surface moisture content of not greater than 0.085% by weight as determined by Karl Fischer titration.

* * * * *

UNITED STATES PATENT AND TRADEMARK OFFICE
CERTIFICATE OF CORRECTION

PATENT NO.   : 6,569,527 B1
DATED        : May 27, 2003
INVENTOR(S)  : Calhoun et al.

It is certified that error appears in the above-identified patent and that said Letters Patent is hereby corrected as shown below:

<u>Title page,</u>
Item [75], Inventors, "Alparetta," should read -- Alpharetta, --.

<u>Column 18,</u>
Lines 22 and 28, "wherein" should read -- such that --.
Line 23, "weight after" should read -- weight even after --.
Line 30, "material after" should read -- material even after --.

<u>Column 19,</u>
Line 36, "content not" should read -- content of not --.
Lines 47 and 53, "wherein" should read -- such that --.
Line 48, "weight after" should read -- weight even after --.
Line 55, "material after" should read -- material even after --.

Signed and Sealed this

Eighth Day of July, 2003

JAMES E. ROGAN
*Director of the United States Patent and Trademark Office*